United States Patent [19]

Holm et al.

[11] Patent Number: 4,624,131
[45] Date of Patent: Nov. 25, 1986

[54] METHOD OF AND APPARATUS FOR TESTING PIPE

[75] Inventors: Albert E. Holm, Marine City; Dennis J. Dorman, Carsonville, both of Mich.

[73] Assignee: Testrite, Inc., Marine City, Mich.

[21] Appl. No.: 773,440

[22] Filed: Sep. 6, 1985

[51] Int. Cl.⁴ .............................................. G01M 3/28
[52] U.S. Cl. .......................................... 73/46; 73/49.1
[58] Field of Search .......................... 73/46, 49.1, 49.8

[56] References Cited

U.S. PATENT DOCUMENTS

| | | | |
|---|---|---|---|
| 2,571,236 | 10/1951 | Hamilton, Jr. | 73/46 |
| 2,761,311 | 9/1956 | Baker | 73/46 |
| 4,010,633 | 3/1977 | Hasha | 73/46 |
| 4,185,492 | 1/1980 | Hauk et al. | 73/46 |
| 4,194,389 | 3/1980 | Laging | 73/46 |

FOREIGN PATENT DOCUMENTS

| | | | |
|---|---|---|---|
| 1225895 | 9/1966 | Fed. Rep. of Germany | 73/46 |
| 697095 | 9/1953 | United Kingdom | 73/46 |

Primary Examiner—Stewart J. Levy
Assistant Examiner—Joseph W. Roskos
Attorney, Agent, or Firm—Burton, Parker & Schramm

[57] ABSTRACT

Leakage of a pipe wall is detected by forming a test chamber around the pipe radially opposite the wall area to be tested by bringing together a pair of test chamber halves each including a semi-annular anvil segment, an outer housing segment and an elastomeric seal sandwiched between the segments with the ends of the anvil segments of the respective test chamber halves being brought into abutment and continued closing movement of the test chambers causing the outer housing segments to extrude the elastomeric seals radially inwardly around the non-yielding anvil and against the pipe surface and circumferentially to effect a hermetic seal at the meeting ends of the test chamber halves and at the pipe wall surface. Thereafter the test chamber formed between the pipe surface and the encircling anvil ring is pressurized and changes in the pressure are read as a function of pipe wall leakage.

13 Claims, 10 Drawing Figures

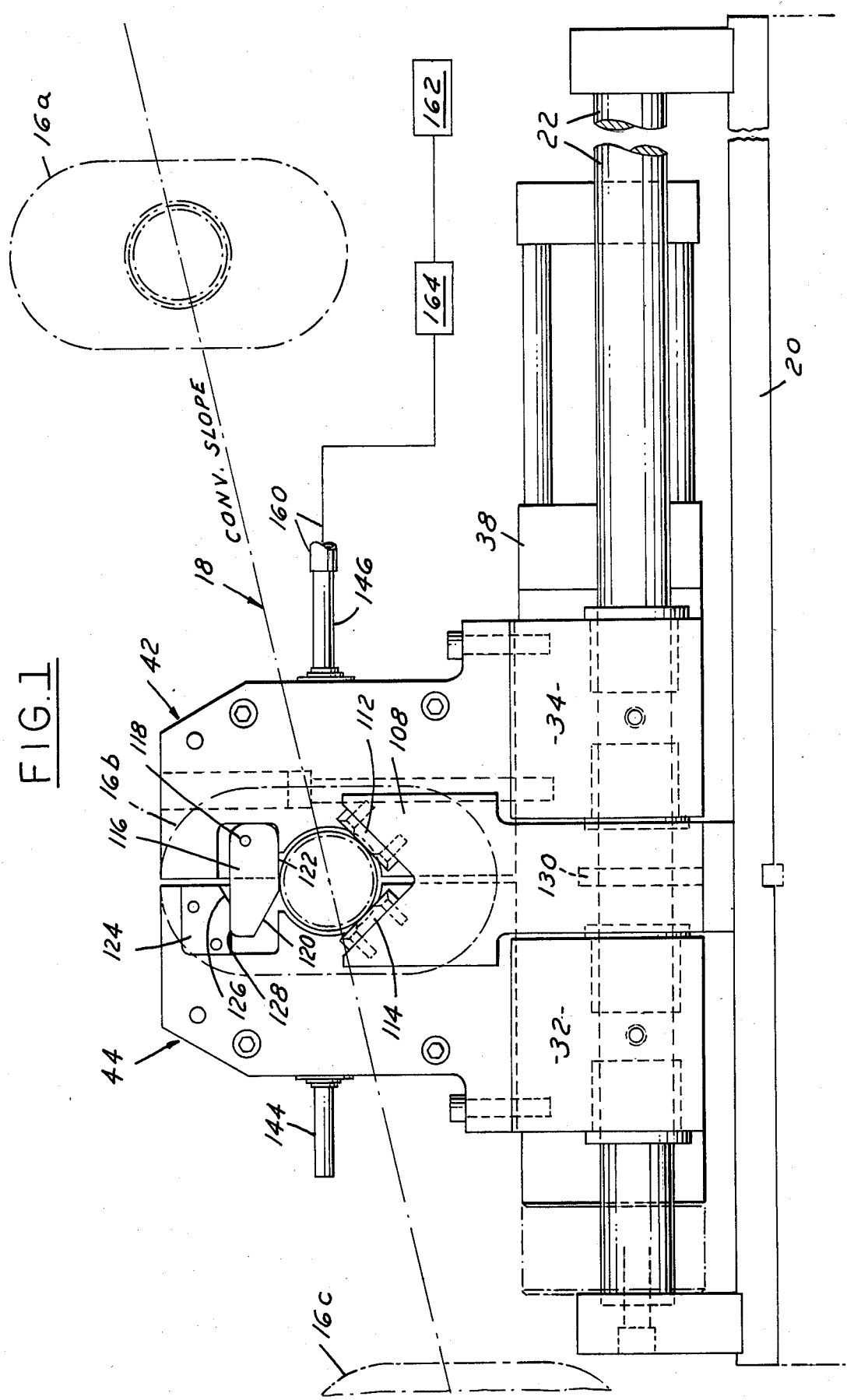

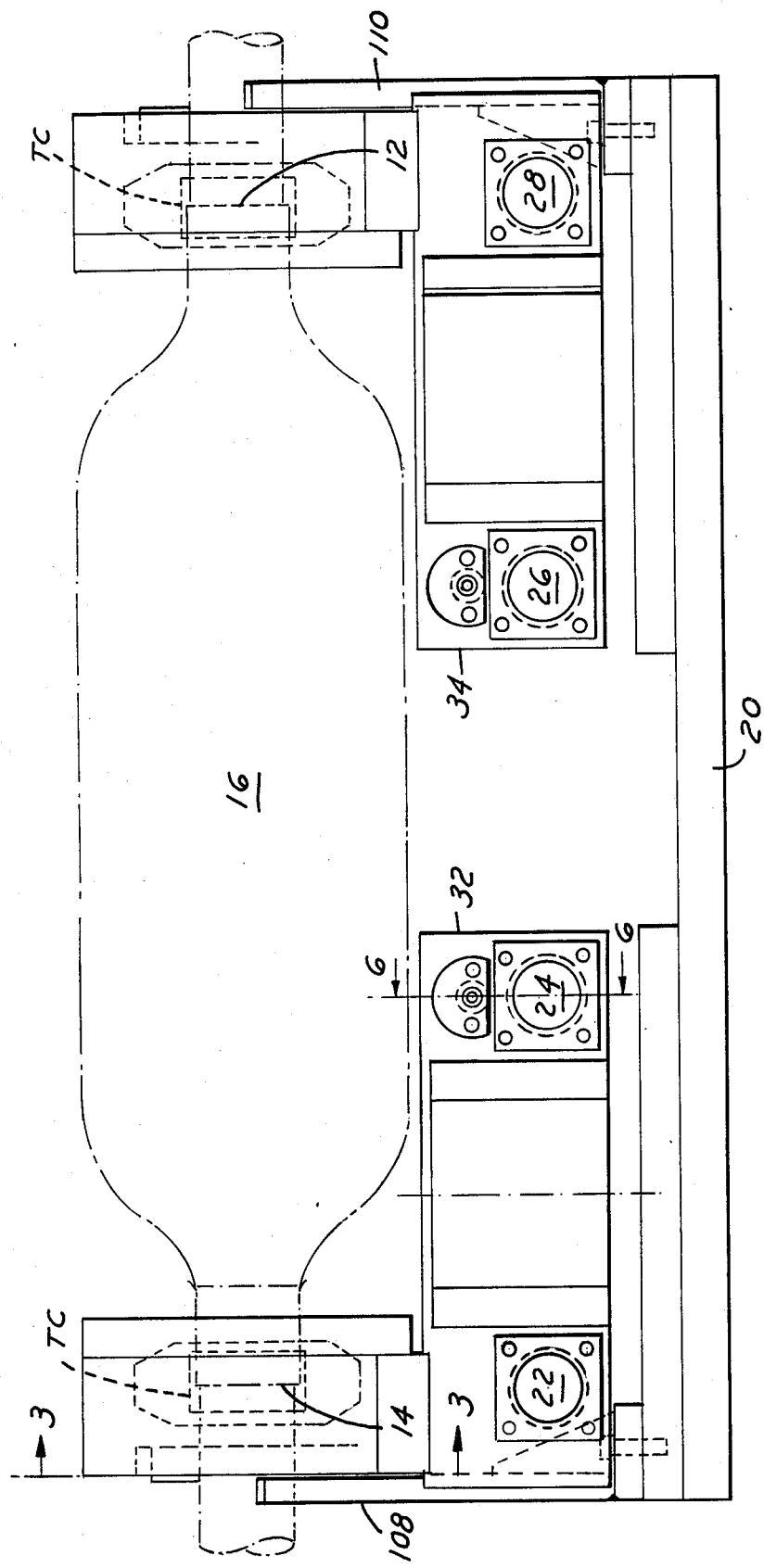

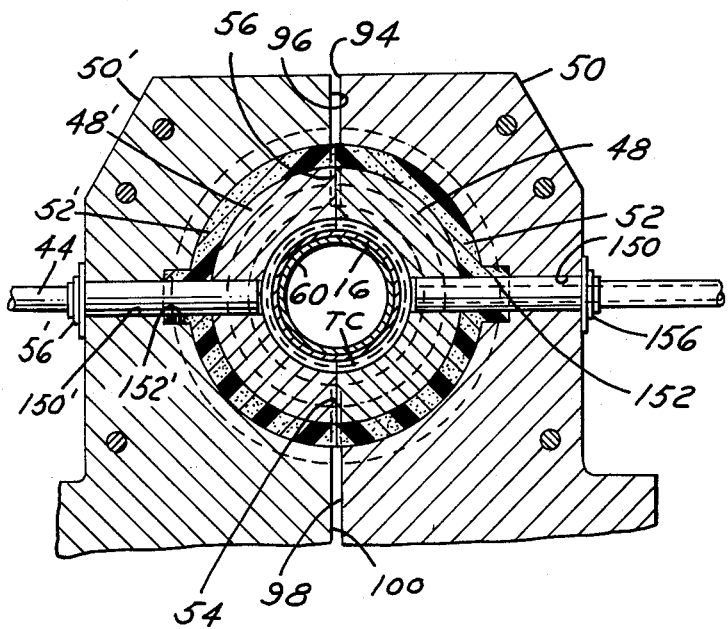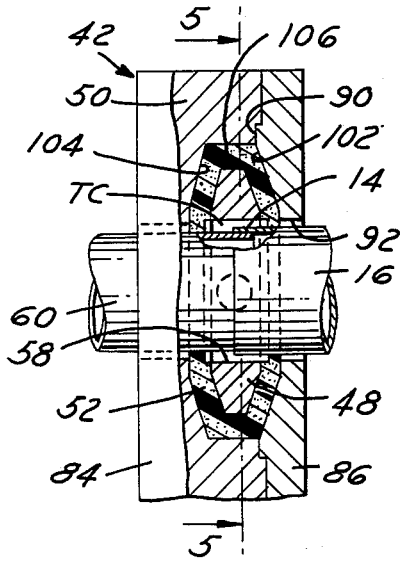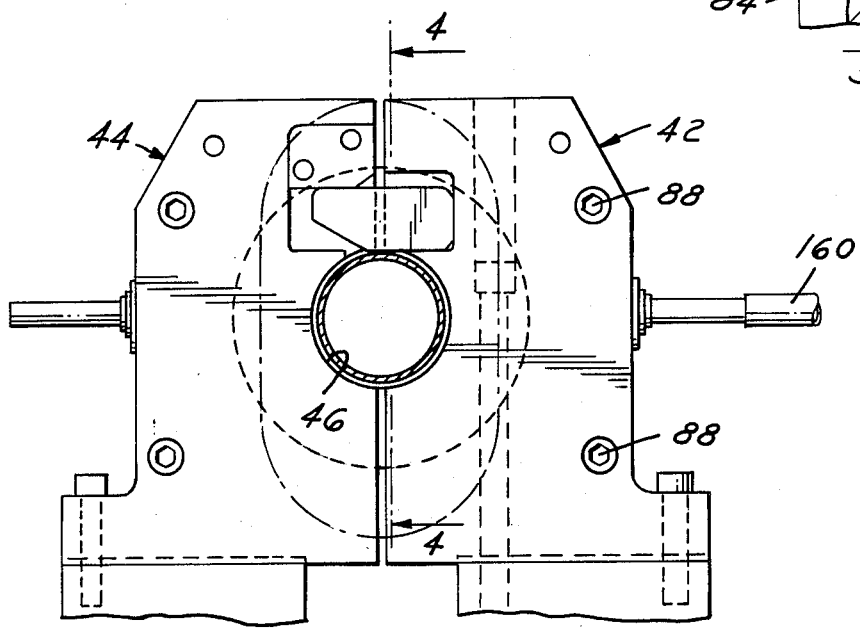

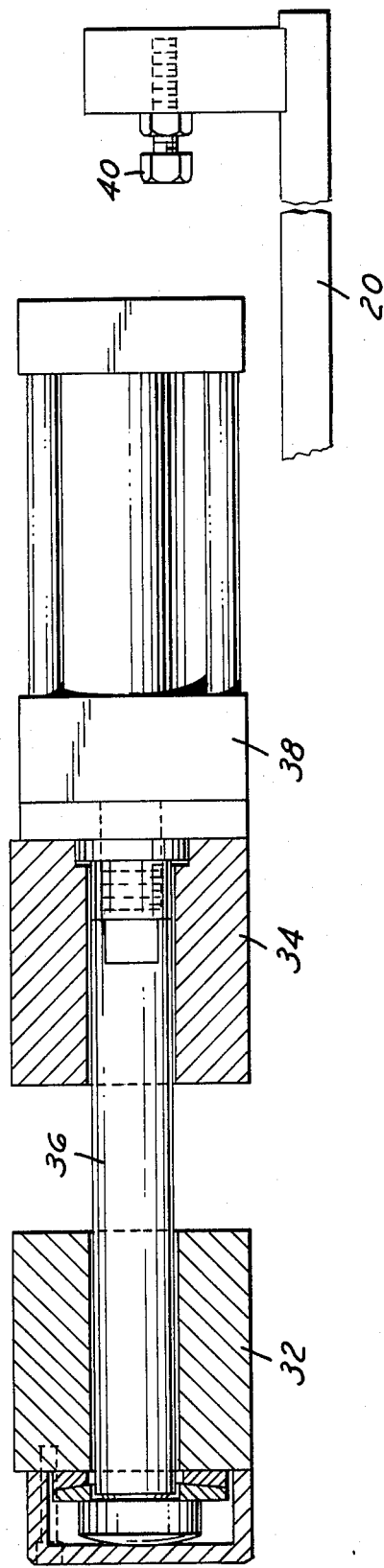
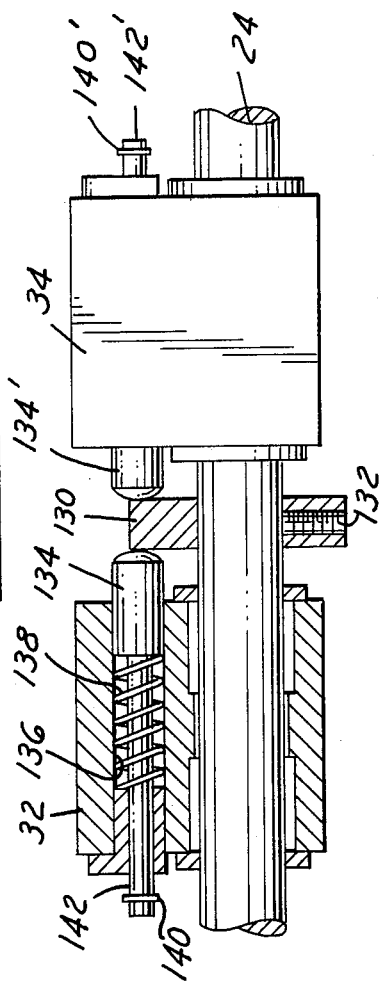
FIG.7
FIG.6

METHOD OF AND APPARATUS FOR TESTING PIPE

DESCRIPTION

1. Field of Invention

This invention relates to the testing of the pipe walls for leakage, particularly, though not exclusively, at welded or other joints.

2. Background of Invention

In the manufacture of automotive exhaust systems it is necessary to insure that the welded joints of the exhaust piping are leakproof to avoid the unwanted escape of highly toxic exhaust gases. Similarly, for welded gas pipe, and numerous other applications, there is the need for testing welded pipe joints for leakage prior to burying the pipe.

Heretofore the general approach has been to create a test chamber around the pipe in the area of the wall to be tested and then the chamber is pressurized and changes in pressure are read as pipe wall leakage. See, for example, U.S. Pat. Nos. 2,571,236; 4,185,492 and 4,194,389. The test chamber is formed of opposed halves which are brought together about the pipe and squeezed against the pipe to effect a seal therewith. A difficulty with this prior art is that the seal is effected by an elastomeric member disposed between the pipe and the edges of the test chamber halves and the sealing action is effected by pressing the edges of the test chamber halves against the elastomer to squeeze it against the pipe. Thus, the volume of the test chamber varies with the force applied to the test chamber halves to effect the seal with the pipe because as the test chamber halves are forced closer together in an effort to insure that the elastomeric seal is effectively engaged with the pipe throughout the circumference thereof and throughout the longitudinal extent of the test chamber, the volume of the test chamber is decreased. Accordingly, the size of the test chamber may vary considerably, depending upon the movement of the test chamber halves as the seal is established. Such volume variation will lead to inaccuracies in testing for leaks.

In addition, unless the test chamber halves are accurately matched to the diameter and curvature of the pipe so that the elastomeric material will completely fill the gap, or if the test chamber halves and the pipe are eccentrically aligned so that the elastomer has difficulty filling the gap, the test chamber may not be sealed against the pipe and the resulting leakage will not be indicative of the true condition of the pipe wall.

To overcome the problems of effecting a seal between the pipe and the test chamber, elaborate sealing arrangements have been provided in some instances, including the embedment of reinforcing structure within the elastomeric elements, particularly as suggested by U.S. Pat. No. 4,185,492. The more complicated the sealing means, the higher the price of the testing equipment, and as the seals tend to wear and must be replaced, this type of prior art equipment becomes costly to maintain.

SUMMARY OF THE INVENTION

We have developed a method and apparatus for leak testing the walls of pipes in a production environment in which the volume of the test chamber formed around the pipe is essentially constant from pipe to pipe and does not vary appreciably with the force with which the test chamber halves are pressed toward the pipe. In addition, out testing apparatus will reliably effect a seal with the pipe in the area of the wall to be tested through the pipe diameter may vary slightly and though there may be some eccentricity in alignment between the test chamber segments and the axis of the pipe. Because we create a test chamber of essentially known volume, we are able to effect test procedures very rapidly and with great accuracy. While there may be some variation in volume as a result of varying pipe wall diameter, or slight variations in seal volume, in production environments with which our apparatus is particularly useful, such variations may be easily accommodated to provide high speed testing.

In carrying out our invention we provide complementary separable test chamber segments cooperatively defining an opening for encircling the pipe to be tested. In the embodiment disclosed, a pair of cooperable test chamber segments is shown. Each test chamber segment includes an anvil ring segment, an outer housing segment, and an elastomeric seal sandwiched between the anvil and housing segments. The anvil ring segments cooperatively form a continuous incompressible anvil ring which encircles the pipe in radially outwardly spaced relation when the ends of the ring segments are in confronting abutment. We urge the outer housing segments toward this continuous incompressible anvil ring to squeeze the elastomeric seal and extrude it against the encircled pipe to form a hermetically sealed test chamber about the pipe. The test chamber is then pressurized or partially evacuated and changes in the pressure thereof are read as pipe wall leakage.

BRIEF DESCRIPTION OF THE DRAWINGS

FIG. 1 is a side elevation of a test station embodying our invention for use in testing weld joints of automotive exhaust systems during manufacture thereof;

FIG. 2 is a front elevation of the test station shown in FIG. 1;

FIG. 3 is a cross-sectional view taken on the line 3—3 of FIG. 2;

FIG. 4 is a cross-sectional view taken on the line 4—4 of FIG. 3;

FIG. 5 is a cross-sectional view taken on the line 5—5 of FIG. 4;

FIG. 6 is a test chamber half centering mechanism taken on the line 6—6 of FIG. 2;

FIG. 7 is a side elevation of the means for urging the test chamber halves together;

BRIEF DESCRIPTION OF PREFERRED EMBODIMENT

Figure 8:
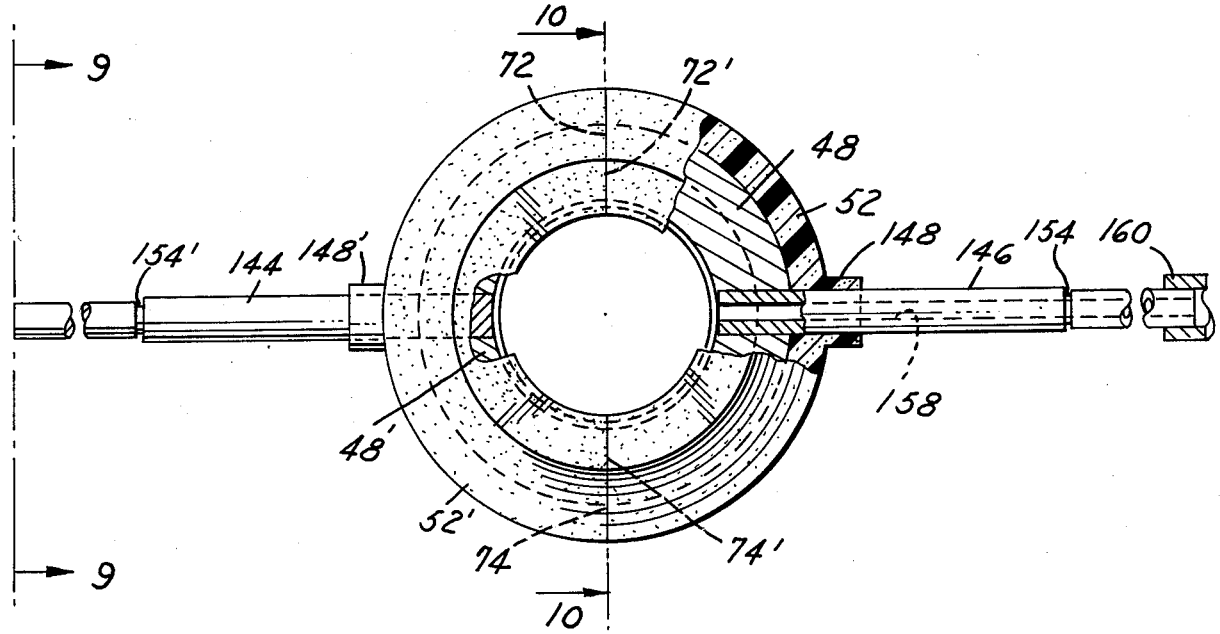
FIG. 8 is a side elevation partially in section of the anvil segments and elastomeric seal segments with the outer housing segments removed for clarity.
Figure 9:
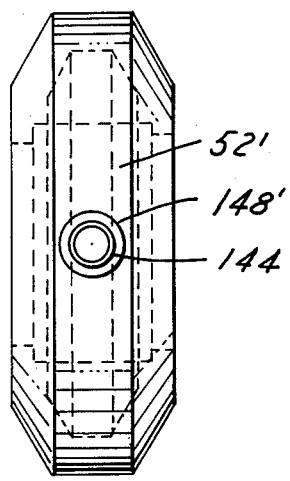
FIG. 9 is an end elevation taken on the line 9—9 of FIG. 8.

The general arrangement of a test station for leak testing the weld seams 12 and 14 at opposite ends of a catalytic converter 16 during manufacture of an automotive exhaust system, is shown in FIG. 1. The exhaust system is delivered through the test station by a conveyor (not shown) along a conveyor path generally indicated at 18. The conveyor delivers successive exhaust systems for testing, which are generally indicated at 16a, 16b and 16c in FIG. 1, with the conveyor pausing when an exhaust system is positioned to be engaged by the test apparatus to carry out the test. The pause in conveyor movement is timed to allow the test apparatus to move into clamping position, clamp onto the exhaust system at opposite ends of the catalytic converter, perform the test, open, and then move out of position to permit the conveyor to move the tested exhaust system onto the next location, such as position 16c, while the system at position 16a is moved to that previously occupied by 16b for testing and the cycle repeats. In this disclosure we have shown and described the apparatus for engaging the exhaust system to create a test chamber to permit testing of the weld seams. Details of the conveyor system for delivering the exhaust pipe assemblies is not a part of this disclosure but will be understood by those skilled in the material handling art.

Testing of the weld seams 12 and 14 may be carried out simultaneously at the same test station. Because the apparatus for effecting the test is the same at each weld seam, our description of the apparatus for testing weld seam 14 will suffice for both. The test station includes a platen 20 supported for vertical movement by mechanism (not shown) whereby the testing apparatus may be raised some 6½ inches into a position to engage an exhaust system at position 16b shown in FIG. 1. Following the testing, the platen is lowered to move the apparatus out of the path of conveyor movement. Mounted on the platen are four guide rods 22, 24, 26 and 28 arranged in pairs with each pair slidably carrying a pair of crossheads such as 32 and 34 shown in FIG. 1. Each pair of crossheads is connected to a fluid pressure actuator as best shown in FIG. 7, where the piston rod 36 is connected to the crosshead 32 while the cylinder 38 is connected to the crosshead 34, whereby, upon alternately pressurizing opposite ends of the cylinder 38, the crossheads 32 and 34 may be caused to move toward or away from each other. Limiting movement of the crossheads is a stop 40 mounted on the platen. The fluid pressure system for pressurizing the cylinders is not shown but will be readily understood by those skilled in the art.

Figure 10:
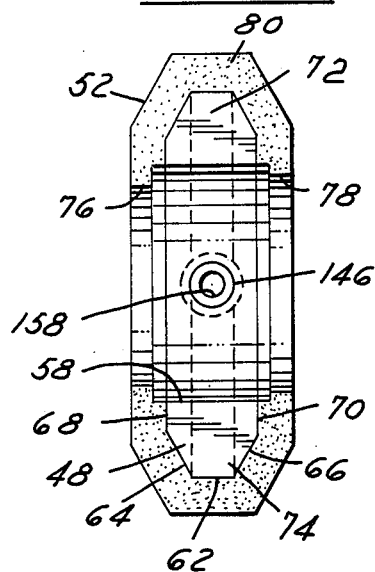
FIG. 10 is a cross-sectional view taken substantially on the line 10—10 of FIG. 8.

Secured to each crosshead and upstanding therefrom is a test chamber half as best shown in FIG. 1, where test chamber half 42 is mounted on crosshead 34 while test chamber half 44 is mounted on crosshead 32. As best shown in FIGS. 3-5, the pair of test chamber segments or halves cooperatively define an opening 46 for encircling the pipe to be tested. Each test chamber segment or half comprises an inner anvil ring segment 48, an outer housing segment 50 and an elastomeric seal 52 sandwiched between the anvil ring segment and the outer housing segment, as best shown in FIG. 4. Corresponding elements in the test chamber segment 44 are indicated by primed reference numerals. Each anvil ring segment comprises a semi-annular ring of steel or other rigid material. The ends of each pair of anvil ring segments are brought into aligned abutment, as at 54 and 56 in FIG. 5, to form a continuous incompressible anvil ring having an internal cylindrical wall 58 spaced radially outwardly from the weld joint 14 at the telescoped ends of the catalytic converter 16 and the pipe 60, forming in the annular gap the test chamber TC. As best shown in FIG. 10, the anvil ring 48 has exterior surfaces which include a cylindrical surface 62 concentric with the inner cylindrical surface 58, a pair of inwardly axially oppositely sloping surfaces 64 and 66 which join parallel radial faces 68 and 70 which lie in planes perpendicular to the axis of the cylindrical opening 46 in the test chamber. Opposite ends of each anvil ring segment are flat and smooth, as at 72 and 74 in FIG. 10, such that corresponding ends of the anvil rings may be brought together in abutment as shown in FIG. 7 to form an essentially continuous incompressible anvil ring about the pipe to be tested. Overlying the outer surfaces of each anvil ring segment is the elastomeric seal 52, which may be formed of neoprene or other suitable elastomer. It is U-shaped in cross-section as best shown in FIG. 10 with an internal configuration closely overlying the external surfaces 62, 64, 66, 68 and 70 of the anvil ring segment. The elastomeric seal has semi-cylindrical sealing lips 76 and 78 extending radially inwardly slightly beyond the inner cylindrical surface 58 of the anvil, with the diameter of lip 76 being slightly less than that of lip 78 to accommodate the difference in diameters of the telescoped tubular portions 16 and 60 of the pipe joint to be tested. The end faces 80 and 82 of each semi-annular elastomeric seal segment and flat and lie substantially co-planar with the end faces 72 and 74 of the anvil segment, such that when the anvil segments are disposed in confronting abutment, the faces 80 and 82 of the opposed elastomeric seal segments will also be in abutment, as shown in FIG. 5.

Encircling the elastomeric seal 52 of each test chamber half is the outer housing 50. The housing closely conforms to the configuration of the exterior of the elastomeric seal and its internal surfaces parallel, but lie spaced radially and/or axially from the exterior surfaces 62, 64, 66, 68 and 70 of the anvil ring, whereby the elastomeric seal is sandwiched between the anvil ring segment and the outer housing segment. To facilitate manufacture of the outer housing, it may be formed of interfitting portions 84 and 86 secured together by bolts or the like 88. Portion 86 may have an annular pilot shoulder 90 interfitting within a provided counter bore in the portion 84 to insure accurate alignment between the housing portions. It will be noted (FIGS. 4, 5 and 10) that the housing halves 50 and 50' exhibit internal diameters at faces 92 which are slightly oversize the weld joint but that the sealing lips 76 and 78 of the elastomeric seal extend radially inwardly beyond the face 92 to contact the pipe.

The end faces 94, 96, 98 and 100 of the outer housing segments which are opposed to each other when the housing segments are disposed about the pipe, are spaced apart, as best shown in FIG. 5, when the ends of the anvil ring segments are in abutment as at 54 and 56. Thus, urging the outer housing segments 50 and 50' toward each other after the anvil ring ends are in abutment, will not serve to decrease the internal diameter of the test chamber TC as defined by the cylindrical surface 58, but will effect a squeezing of the elastomeric seal against the anvil ring and cause the seal to be extruded from between the anvil and the outer housing at the lips 76 and 78 to force the lips more tightly against the pipe at opposite axial ends of the weld joint. Thus, the lips 76 and 78 of the elastomeric seal are forced more tightly against the pipe, though the volume of the test chamber remains substantially constant. It will be noted from a consideration of the drawings that the internal surfaces 102, 104 and 106 of the outer housing will direct squeezing forces against the elastomeric seal that urge the seal radially inwardly to cause the aforesaid extrusion. It will further be noted that the cylindrical wall 58 defined by the internal diameter of the anvil ring establishes the outside diameter of the test chamber and essentially the axial length thereof, though this may vary slightly with the extrusion of the lips of the elastomeric seal. In addition to causing a radial inward extrusion of the elastomeric seal to effect a hermetically tight joint with the pipe, the extrusion occurring between the anvil ring and the outer housing produces circumferential extrusion of the elastomeric seal, causing it to effect a hermetically tight joint at the end faces 80 and 82 at the surface areas 54 and 56 of the elastomeric seal. Thus, the test chamber is sealed both at its contact with the circumference of the pipe and also at the joints where the semi-annular elastomeric seals meet.

By virtue of the construction herein disclosed, the test apparatus may accommodate slight mismatching of the pipe diameter with the internal diameter of the test chamber opening 46, and may also accommodate some eccentricity in the coaxial alignment of the pipe being tested and the opening 46. However, the apparatus herein disclosed is intended to minimize possible eccentricity by providing for locating means adjacent the test chamber halves. As best shown in FIG. 1, upstanding from the platen 20 are a pair of V-block centering supports 108 and 110 which cradle the exhaust system as the platen rises, and support the system on pads 112 and 114 mounted on each support. To insure that the exhaust system is in firm engagement with the pads, chamber half 42 is provided with a positioning foot 116 pivoted as at 118 to the test chamber half and provided with a sloping surface 120 and a positioning surface 122. The test chamber half 44 is provided with a camming block 124 having a sloping surface 126 which will cooperate with the rounded corner 128 of the pivoted foot. As the test chamber halves are urged together, the pivoted foot will first contact the exhaust system, and if it is not fully down against the pads 112 and 114, the surface 120 will engage the exhaust system and the rounded nose 128 will engage the sloping surface 126, urging the pivoted foot down to seat the exhaust system against the pads 112 and 114, and as the pivoted foot slides beneath the cam 124, the exhaust system is locked in place against the pads insuring accurate positioning of the exhaust assembly for the testing operation.

To insure proper centering of the test chamber halves, a centering mechanism is provided as best shown in FIGS. 1 and 6. It includes a stop collar 130 mounted on each of the rods 24 and 26 and fixed in position by a suitable set screw 132. Each of the crossheads 32 and 34 includes a springloaded plunger 134 received in a bore 136 with a compression spring 138 urging the plunger outwardly. Outward movement of the plunger may be limited by a snap ring 140 on the end of the plunger rod 142. As the cylinders 38 shift the crossheads toward each other, one of the plungers 134 (or corresponding plunger 134') will engage the stop collar 130 and thereby inhibit further movement of the associated crosshead. This will cause the cylinder 38 and its piston 36 to move the other crosshead so that its plunger engages the collar and further compression of the test chamber halves toward each other will merely serve to depress the plungers 134 and 134' into their respective crossheads.

It will be noted thus far from the description that the elastomeric seals 52 and 52' tend to float between its anvil segment and outer housing segment. The anvil, the seal and the outer housing segment of each test chamber half comprise an assembly. Means are provided for holding the assembly together, and comprises a radially extending connector 144 for the test chamber half 44 and a connector 146 for the test chamber half 42. The connectors 144 and 146 are disposed on a diameter of the test chamber halves parallel to opening and closing movement of such halves when the pipe to be tested is embraced. As best shown in FIGS. 5 and 8-10, the connectors 144 and 146 are cylindrically shaped and secured at their inner ends to the anvil segments 48 and 48' as by threading, upsetting, or the like. The connectors extend outwardly through the elastomeric bosses 148 and 148' which are integral with the semi-annular elastomeric seals 52 and 52'. The outer housing halves 50 and 50' are provided with suitable bores 150 and 150' and counter bores 152 and 152' to slidably receive the connectors. The counter bores 152 and 152' are sized to bear against the integral bosses 148 and 148' and as the housing segments are urged toward the anvil ring they compress the elastomeric material of the bosses to effect a tight seal therewith around the connectors.

The connectors are provided with grooves 154 and 154' for reception of a snap ring 156 and 156' which overlie the outside of the housing segments 50 and 50' to retain the anvil and seal segments within the housing. Thus, the anvil and test chamber halves are loosely coupled for relative movement therebetween as aforesaid.

Connector 146 is further provided with an internal passageway 158 for establishing fluid pressure communication between the test chamber and apparatus for sensing pressure changes therewithin. For this purpose, a suitable flexible conduit 160 is connected to the end of connector 146 and extends to apparatus for pressurizing or creating a partial vacuum schematically shown at 162. Means for sensing the pressure or partial vacuum is indicated at 164. Such means is not herein specifically disclosed, but suitable apparatus for this purpose is disclosed in U.S. Pat. No. 4,430,891 or the copending application of Albert E. Holm and Grant A. Holm, Ser. No. 579,701, filed Feb. 13, 1984, both of which are incorporated herein by reference. Suitable pressurizing and pressure sensing apparatus for measuring pressure changes within a test chamber for purposes of determining leakage may be acquired from Testrite, Inc., of Marine City, Mich. 48039.

In order to conduct a test of the pipe wall, the exhaust system is moved into position 16b in FIG. 1 with the test chamber halves 42 and 44 spaced apart. The platen 20 is then raised to the position shown to bring the pads 112 and 114 substantially into engagement with the exhaust system. Thereupon the cylinders 38 are pressurized to move the crossheads and, in turn, the chamber halves toward each other to embrace the exhaust system therebetween. The pivoted feet 116 associated with each test chamber will bear against the exhaust system and press it downwardly against the pads 112 and 114 to insure proper positioning of the exhaust system prior to the test.

As the test chamber halves 42 and 44 approach each other, the anvil faces 72 and 74 approach the corresponding opposed anvil faces 72' and 74' of the opposite anvil ring, and when such faces are brought into abutment, further movement of the anvil ring segments stops, and as the outer housing segments 50 and 50' continue to move, the elastomeric seal is extruded to urge the lips 76 and 78 tightly against the encircled pipe to effect a hermetically sealed test chamber and also to extrude the seal at the faces 80 and 82 against the opposed faces of the opposite elastomeric seal, whereby the chamber is hermetically closed at such interface.

Once the test chamber has been hermetically sealed against the pipe, the chamber may be pressurized or partially evacuated and the test procedure carried out. In the event the pipe joint leaks, the pressure within the test chamber will change as a result of fluid pressure either leaking into the chamber from within the pipe or as a result of fluid pressure leaking out of the chamber through the defective joint into the interior of the pipe. Such pressure changes are read as a function of chamber leakage in accordance with the teaching of the referenced patent or application incorporated herein by reference.

We claim:

1. The method of testing a wall area of a pipe for leakage comprising the steps of:
   encircling the pipe opposite the area to be tested with an anvil ring spaced radially outwardly therefrom by bringing the ends of complementary ring segments into end-abutting relation about the pipe;
   squeezing an elastomeric seal against the surface of the anvil ring in a direction and at locations to displace the elastomer radially inwardly at axially opposite ends of the area to be tested to fill the gaps between the anvil ring and the pipe to form a hermetically sealed test chamber therebetween; and
   reading a change in pressure in the sealed test chamber as a function of pipe leakage.

2. The method of testing the wall of a pipe for leakage comprising the steps of:
   encircling the pipe in the area of the wall to be tested with a pair of test chamber halves each comprising an elastomeric seal sandwiched between an inner anvil ring segment and an outer housing segment;
   bringing the ends of the anvil ring segments together to form a continuous incompressible anvil ring encircling the pipe spaced therefrom;
   urging the housing segments toward the pipe and continuous anvil ring to compress the elastomeric seal and extrude it against the pipe to form a test chamber thereabout; and
   reading a change in pressure in the test chamber as a function of pipe wall leakage.

3. In apparatus for determining leakage in the wall of a pipe:
   complementary separable test chamber segments cooperatively defining an opening for encircling the pipe to be tested;
   each test chamber segment comprising an inner anvil ring segment, an outer housing segment, and an elastomeric seal sandwiched therebetween;
   said anvil ring segments cooperatively forming a continuous incompressible anvil ring encircling in radially spaced relation the pipe to be tested when the ends of the ring segments are in confronting abutment; and
   means for urging the outer housing segments toward said anvil ring to squeeze the elastomeric seal and extrude it against an encircled pipe to form an hermetically sealed test chamber about the pipe.

4. The invention defined in claim 3 wherein the test chamber segments cooperatively define a cylindrical opening.

5. The invention defined in claim 4 wherein the test chamber segments each comprise half of the test chamber and each anvil segment and each elastomeric seal is semiannularly shaped.

6. The invention defined by claim 3 wherein each anvil ring segment, the outer housing segment, and the elastomeric seal sandwiched therebetween, comprise a unitary assembly.

7. The invention defined by claim 3 wherein means are provided for connecting together the inner anvil ring segment and the outer housing segment of each test chamber segment for limited relative movement toward and from each other, permitting extrusion of the elastomeric seal from therebetween when the outer housing segments are urged toward the anvil ring.

8. The invention defined by claim 3 wherein said elastomeric seal is generally U-shaped in cross-section and the inner anvil ring segment is disposed within such U-shape, and the outer housing segment overlies the seal, and the free edges of the U-shaped seal from opposite axial ends of the test chamber.

9. The invention defined by claim 3 wherein said means comprise force applying means connected between and to the outer housing segments.

10. The invention defined by claim 9 wherein said means in one of the test chamber segments comprises a fluid pressure conduit to establish communication with the interior of the test chamber.

11. The invention defined by claim 3 wherein said anvil segments are resiliently carried within the outer housing segments by the elastomeric seal.

12. The invention defined by claim 3 wherein means are provided extending from each of the inner anvil segments through the elastomeric seal and through the outer housing segment to connect the same together in unitary assemblies.

13. Apparatus for determining leakage at spaced apart locations of a hollow tubular assembly comprising:
   conveyor means for delivering successive assemblies in a step-by-step mode to a position to be tested;
   means including an elevator for positioning a tubular assembly at the test position;
   a pair of test chambers mounted on the elevator and movable between open and closed positions and in the open position shiftable by the elevator to embrace the tubular assembly at spaced apart locations;
   each test chamber including a pair of anvil ring segments, a pair of housing segments surrounding the anvil segments, and an elastomeric seal sandwiched between the anvil and housing segments;
   means for urging the housing segments toward each other to extrude the elastomeric seal toward an embraced tubular assembly when the anvil segments have been brought together as a continuous anvil ring and thereby effect a seal between the test chamber and the encircled tubular assembly; and
   means for pressurizing each test chamber and reading pressure changes therein as a function of leakage of the tubular assembly.

* * * * *

UNITED STATES PATENT AND TRADEMARK OFFICE
CERTIFICATE OF CORRECTION

PATENT NO.   :   4,624,131

DATED        :   November 25, 1986

INVENTOR(S) :   Albert E. Holm and Dennis J. Dorman

It is certified that error appears in the above-identified patent and that said Letters Patent is hereby corrected as shown below:

In column 8, line 20, change "from" to --form--.

Signed and Sealed this

Twenty-fourth Day of February, 1987

Attest:

DONALD J. QUIGG

Attesting Officer         Commissioner of Patents and Trademarks